(12) United States Patent
Lee et al.

(10) Patent No.: US 12,542,272 B2
(45) Date of Patent: Feb. 3, 2026

(54) NEGATIVE ACTIVE MATERIAL AND RECHARGEABLE LITHIUM BATTERY INCLUDING SAME

(71) Applicant: SAMSUNG SDI CO., LTD., Yongin-si (KR)

(72) Inventors: Eunjoo Lee, Yongin-si (KR); Yongseok Kim, Yongin-si (KR); Jaewon Kim, Yongin-si (KR); Jaehou Nah, Yongin-si (KR); Kyeu Yoon Sheem, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 661 days.

(21) Appl. No.: 17/939,142

(22) Filed: Sep. 7, 2022

(65) Prior Publication Data

US 2023/0078236 A1 Mar. 16, 2023

(30) Foreign Application Priority Data

Sep. 9, 2021 (KR) .......................... 10-2021-0120602

(51) Int. Cl.
*H01M 4/36* (2006.01)
*H01M 4/02* (2006.01)
(Continued)

(52) U.S. Cl.
CPC ........... *H01M 4/364* (2013.01); *H01M 4/366* (2013.01); *H01M 4/386* (2013.01);
(Continued)

(58) Field of Classification Search
CPC ....... H01M 4/364; H01M 4/133; H01M 4/386
See application file for complete search history.

(56) References Cited

U.S. PATENT DOCUMENTS

| 2014/0154562 A1 | 6/2014 | Fukuchi |
| 2017/0352878 A1 | 12/2017 | Kajita |

(Continued)

FOREIGN PATENT DOCUMENTS

| CN | 103855402 A | | 6/2014 | |
| CN | 103779544 A | * | 5/2017 | ............ H01M 4/139 |

(Continued)

OTHER PUBLICATIONS

European Search Report dated Jan. 31, 2023.
(Continued)

*Primary Examiner* — Barbara L Gilliam
*Assistant Examiner* — Benjamin T Lustgraaf
(74) *Attorney, Agent, or Firm* — Lee IP Law, P.C.

(57) ABSTRACT

A negative active material for a rechargeable lithium battery and a rechargeable lithium battery, the negative active material includes a porous silicon-carbon composite that includes silicon, carbon, and magnesium silicate ($MgSiO_3$), wherein the negative active material has a diffraction peak intensity ratio $I_{MgSiO3(610)}/I_{Si(111)}$ of $0.001 < I_{MgSiO3(610)}/I_{Si(111)} < 0.01$, which is a ratio of a diffraction peak intensity $I_{MgSiO3(610)}$ by $MgSiO_3$ at $2\theta=30°$ to $32°$ to a diffraction peak intensity $I_{Si(111)}$ by $Si(111)$ detected at $2\theta=27.5°$ to $29.5°$ in a X-ray diffraction analysis.

19 Claims, 1 Drawing Sheet

(51) Int. Cl.
  *H01M 4/38* (2006.01)
  *H01M 4/58* (2010.01)
  *H01M 4/587* (2010.01)
  *H01M 10/0525* (2010.01)

(52) U.S. Cl.
  CPC ......... *H01M 4/5825* (2013.01); *H01M 4/587* (2013.01); *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2020/0014026 A1 | 1/2020 | Song et al. | |
| 2020/0295352 A1* | 9/2020 | Oh | H01M 10/0525 |
| 2021/0184204 A1 | 6/2021 | Oh | |
| 2022/0209228 A1* | 6/2022 | Oh | H01M 4/5825 |

FOREIGN PATENT DOCUMENTS

| | | |
|---|---|---|
| CN | 111418095 A | 7/2020 |
| CN | 111433949 A | 7/2020 |
| KR | 10-2019-0066596 A | 6/2019 |
| KR | 10-2019-0116012 A | 10/2019 |
| KR | 10-2020-0052263 A | 5/2020 |
| KR | 10-2020-0100252 A | 10/2020 |
| KR | 10-2020-0126344 A | 11/2020 |
| KR | 10-2020-0144855 A | 12/2020 |

OTHER PUBLICATIONS

Korean Patent Gazette for Korean Patent KR 10-2758746 B1, published Jan. 21, 2025.
An et al., Nature Communications, 10: 1447 (2019).
Chinese Search Report dated May 26, 2025, which was attached to Office Action dated May 29, 2025, of the corresponding Chinese Patent Application No. 202211077351.3.

* cited by examiner

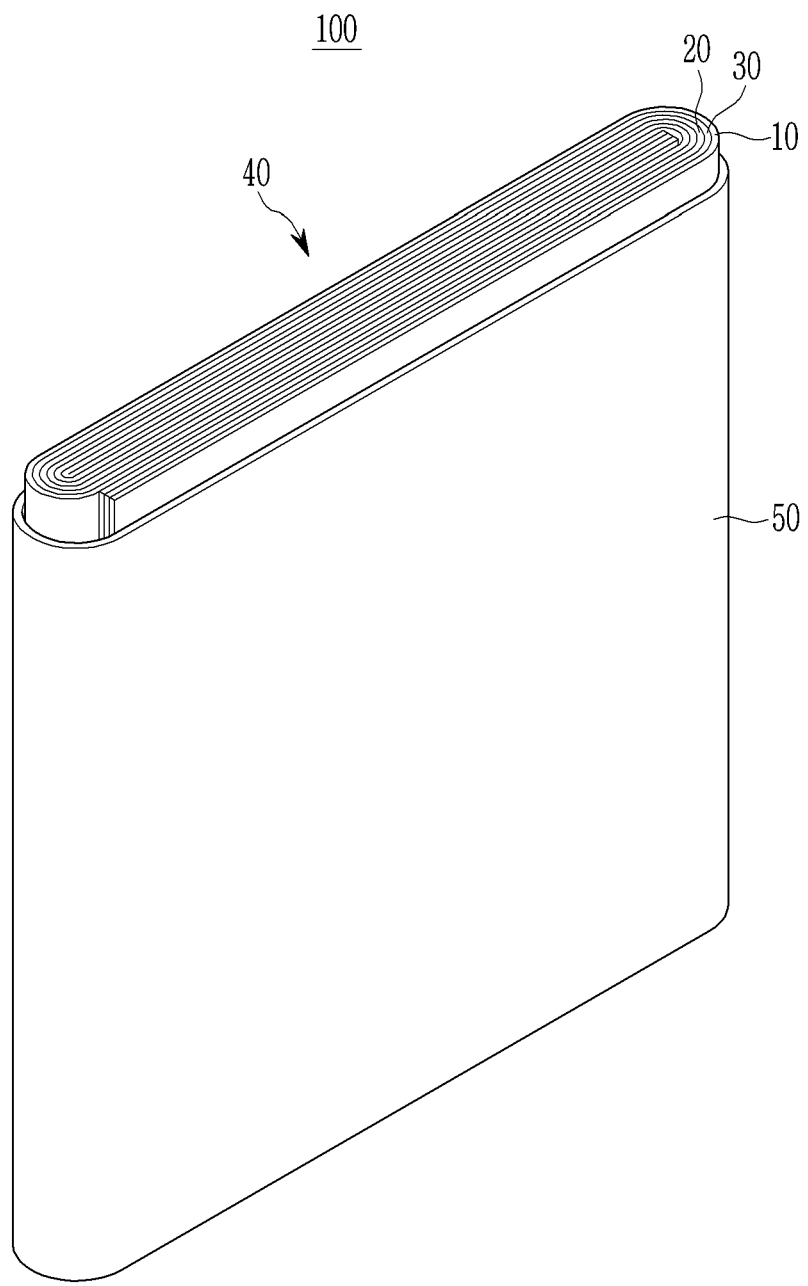

NEGATIVE ACTIVE MATERIAL AND RECHARGEABLE LITHIUM BATTERY INCLUDING SAME

CROSS-REFERENCE TO RELATED APPLICATION

This application claims priority to and the benefit of Korean Patent Application No. 10-2021-0120602 filed in the Korean Intellectual Property Office on Sep. 9, 2021, the entire contents of which are incorporated herein by reference.

BACKGROUND

1. Field

Embodiments relate to a negative active material and a rechargeable lithium battery including the same.

2. Description of the Related Art

Electric vehicle and ESS (energy storage system) market expansion use high-capacity and high efficiency batteries, and using a silicon material as a negative active material of the battery have been considered.

SUMMARY

The embodiments may be realized by providing a negative active material for a rechargeable lithium battery, the active material comprising a porous silicon-carbon composite that includes silicon, carbon, and magnesium silicate ($MgSiO_3$), wherein the negative active material has a diffraction peak intensity ratio $I_{MgSiO3(610)}/I_{Si(111)}$ of $0.001 < I_{MgSiO3(610)}/I_{Si(111)} < 0.01$, which is a ratio of a diffraction peak intensity $I_{MgSiO3(610)}$ by $MgSiO_3$ at $2\theta=30°$ to $32°$ to a diffraction peak intensity $I_{Si(111)}$ by $Si(111)$ detected at $2\theta=27.5°$ to $29.5°$ in a X-ray diffraction analysis.

The magnesium silicate may be included in the negative active material in an amount of about 0.01 wt % to about 1.0 wt %, based on a total weight of the negative active material.

The magnesium silicate may be included in the negative active material in an amount of about 0.01 wt % to about 0.6 wt %, based on a total weight of the negative active material.

The carbon may include amorphous carbon.

The amorphous carbon may include soft carbon, hard carbon, or a combination thereof.

The carbon may be included in the negative active material in an amount of about 5 wt % to about 45 wt %, based on a total weight of the negative active material.

The porous silicon-carbon composite may include pores, and the carbon may cover an exterior wall of the pores, the silicon, and the magnesium silicate.

The pores may have an average size of about 50 nm or more.

The pores may have an average size of about 50 nm to 500 nm.

The negative active material may be prepared by primary heat-treating magnesium silicide to prepare a heated product, etching the heated product to prepare a porous silicon, mixing the porous silicon with an amorphous carbon precursor to prepare a mixture, and secondary heat-treating the mixture.

The primary heat treatment may be performed under an air atmosphere.

The primary heat treatment may be performed at about 600° C. to about 700° C. for about 5 hours to about 30 hours.

The etching may be performed using an acid.

The acid may be hydrochloric acid.

A mixing ratio of the porous silicon and the amorphous carbon precursor may be about 95:5 to about 55:45 by weight.

The secondary heat treatment may be performed at about 800° C. to about 1,200° C.

The embodiments may be realized by providing a rechargeable lithium battery including a negative electrode including the negative active material according to an embodiment; a positive electrode including a positive active material; and a non-aqueous electrolyte.

The negative electrode may include the negative active material as a first negative active material, and crystalline carbon as a second negative active material.

A mixing ratio of the first negative active material and the second negative active material may be about 1:99 to about 40:60 by weight.

BRIEF DESCRIPTION OF THE DRAWING

Features will be apparent to those of skill in the art by describing in detail exemplary embodiments with reference to the attached drawing in which:

The FIGURE is a schematic view showing the structure of a rechargeable lithium battery according to an embodiment.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing FIGURE, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout. As used herein, the term "or" is not an exclusive term, e.g., "A or B" would include A, B, or A and B.

A negative active material for a rechargeable lithium battery may include a porous silicon-carbon composite. The porous silicon-carbon composite may include, e.g., silicon, carbon, and magnesium silicate ($MgSiO_3$).

The negative active material may have a diffraction peak intensity ratio $I_{MgSiO3(610)}/I_{Si(111)}$ of $0.001 < I_{MgSiO3(610)}/I_{Si(111)} < 0.01$, which is a ratio of a diffraction peak intensity $I_{MgSiO3(610)}$ by $MgSiO_3$ at $2\theta=30°$ to $32°$ to a diffraction peak intensity $I_{Si(111)}$ by $Si(111)$ detected at $2\theta=27.5°$ to $29.5°$ in X-ray diffraction analysis. In an implementation, when the diffraction peak intensity ratio, $I_{(MgSiO3(610)}/I_{Si(111)}$ of the negative active material is within the range, the improved initial efficiency and cycle-life characteristics may be exhibited. If the diffraction peak intensity ratio, $I_{MgSiO3(610)}/I_{Si(111)}$ were to be 0.001 or less, or 0.01 or more, the initial efficiency could be deteriorated and the cycle-life characteristics could also be deteriorated.

The X-ray diffraction analysis may be measured by using a CuKα ray as a target ray.

The negative active material according to one embodiment may be include magnesium silicate ($MgSiO_3$) in an amount of, e.g., about 0.01 wt % to about 1.0 wt %, based on a total weight of the negative active material. In an implementation, the negative active material according to one embodiment may be include magnesium silicate ($MgSiO_3$) in an amount of, e.g., about 0.01 wt % to about 0.6 wt %. When the amount of magnesium silicate is within the ranges, the charge and discharge efficiency and the cycle-life characteristics may be improved.

In the negative active material according to one embodiment, magnesium silicate may be discontinuously and randomly present (e.g., in an island form) on a surface of the active material, rather than continuously present on the surface of the active material.

In an implementation, the carbon may be amorphous carbon. When the carbon included in the silicon-carbon composite is the amorphous carbon, it may be uniformly coated on silicon, so the conductivity may be further improved, and power may be excellent, compared to crystalline carbon. An amount of the amorphous carbon may be, e.g., about 5 wt % to about 45 wt %, based on the total weight of the negative active material.

The amorphous carbon may be soft carbon, hard carbon, or a combination thereof.

In the negative active material, the silicon-carbon composite may be a porous silicon-carbon composite and may have pores of which an average size is, e.g., about 50 nm or more or about 50 nm to about 500 nm. In an implementation, the pores may have an average size of about 50 nm to about 100 nm. The silicon-carbon composite including pores may facilitate effective inhibition of the volume expansion of silicon generated during charging and discharging using the negative active material. This may be because the included pores may absorb the expanded volume, thereby suppressing the expansion of the total volume of the negative active material. The effects by suppressing the volume expansion due to pores may be more effectively obtained from pore average size of about 50 nm or more.

In an implementation, the pore size may be measured by a nitrogen adsorption method (BJH method), mercury porosimetry, or the like.

The negative active material according to one embodiment may have a structure that includes pores therein. In an implementation, the carbon may cover a wall (e.g., an interior or exterior wall) of the pores, the silicon, and the magnesium silicate.

The active material according to one embodiment may prepared by the following procedures.

Magnesium silicide ($Mg_2Si$) may be primarily heat-treated under an air atmosphere. The primary heat treatment may be performed at about 600° C. to about 700° C. The primary heat treatment may be performed for about 5 hours to about 30 hours.

The primary heat-treatment may oxidize the magnesium silicide to generate MgO and Si, and may partially convert or form magnesium silicate, $MgSiO_3$.

The generation of magnesium silicate from the primary heat treatment may be obtained under the air atmosphere. If the heat-treatment were to be performed under a $N_2$ or $CO_2$ atmosphere, $MgSiO_3$ may not be generated, which is not desired.

If the heat treatment were to be performed at a temperature out of the range, $Mg_2Si$ could remain, and a side-reaction could occur. In an implementation, when the heat treatment is performed under the above-described conditions, a negative active material including magnesium silicate at a desired amount may be suitably prepared.

Thereafter, the heat treatment product may be etched using an acid. This procedure may be performed by immersing the heat-treated product in the acid. After etching, it may be filtrated to obtain an etched product. In the etching procedure, the generated MgO may be dissolved in the acid, and thus, the etched product may be formed in the form of a porous silicon.

The acid may be hydrochloric acid.

Thereafter, the formed porous silicon may be mixed with an amorphous carbon precursor.

The amorphous carbon precursor may include, e.g., petroleum-based cokes, coal-based cokes, petroleum-based pitch, coal-based pitch, green cokes, or a combination thereof.

A mixing ratio of the porous silicon and the amorphous carbon precursor may be, e.g., about 95:5 to about 55:45 by weight.

In an implementation, the mixing of the porous silicon and the amorphous carbon precursor may help control the generated pore to be a desired size. In an implementation, when the mixing ratio of the porous silicon and the amorphous carbon precursor satisfies the range, the obtained pore size may be controlled to be about 50 nm or more, e.g., about 50 nm or more and about 500 nm or less.

The mixture may be secondarily heat-treated to prepare a negative active material. The secondary heat-treatment may be performed at about 800° C. to about 1,200° C.

According to the secondary heat-treatment, the amorphous carbon precursor may form an amorphous carbon which may be included in the final product, as an amorphous carbon.

Another embodiment provides a rechargeable lithium battery including a negative electrode, a positive electrode, and an electrolyte.

The negative electrode may include a current collector and a negative active material layer including the negative active material according to one embodiment.

The negative active material layer may further include a crystalline carbon negative active material. The crystalline carbon negative active material may include, e.g., unspecified shaped, sheet-shaped, flake-shaped, spherically-shaped, or fiber-shaped natural graphite or artificial graphite.

When the negative active material layer includes the negative active material according to one embodiment as a first negative active material, and crystalline carbon negative active material as a second negative active material, the first negative active material may be positioned between the second negative active material particles to have good contact with the second negative active material, thereby more effectively inhibiting the expansion of the negative electrode. In an implementation, the mixing ratio of the first negative active material:the second negative active material may be, e.g., about 1:99 to about 40:60 by weight. When the first negative active material and the second negative active material are mixed and used at the range, the current density of the negative electrode may be further improved, and the thin film electrode may be prepared. In an implementation, the first negative active material including silicon in the negative electrode may be more uniformly presented, and thus, the negative electrode expansion may be more effectively suppressed.

In the negative active material layer, the amount of the negative active material may be about 95 wt % to about 99 wt %, based on the total weight of the negative active material layer.

The negative active material layer may include a binder, and may further include a conductive material. In the negative active material layer, the amount of the binder may be, e.g., about 1 wt % to about 5 wt % based on the total weight of the negative active material layer. In an implementation, when the conductive material is further included, about 90 wt % to about 98 wt % of the negative active material, about 1 wt % to about 5 wt % of the binder, and about 1 wt % to about 5 wt % of the conductive material may be used.

The binder may help improve binding properties of negative active material particles with one another and with a current collector. The binder may be a non-aqueous binder, an aqueous binder, or a combination thereof.

The non-aqueous binder may include, e.g., ethylene propylene copolymer, polyacrylonitrile, polystyrene, polyvinylchloride, carboxylated polyvinylchloride, polyvinylfluoride, polyurethane, polytetrafluoro ethylene, polyvinylidene fluoride, polyethylene, polypropylene, polyamide imide, polyimide, or a combination thereof.

The aqueous binder may include, e.g., a styrene-butadiene rubber, an acrylated styrene-butadiene rubber (ABR), an acrylonitrile-butadiene rubber, an acrylic rubber, a butyl rubber, a fluorine rubber, an ethylene oxide-containing polymer, polyvinyl pyrrolidone, polyepichlorohydrin, polyphosphazene, an ethylene propylene diene copolymer, polyvinylpyridine, chlorosulfonated polyethylene, latex, polyester resin, an acrylic resin, a phenolic resin, an epoxy resin, polyvinyl alcohol, or a combination thereof.

When the aqueous binder is used as a negative electrode binder, a cellulose compound may be further included to provide viscosity as a thickener. The cellulose compound may include, e.g., carboxymethyl cellulose, hydroxypropylmethyl cellulose, methyl cellulose, or alkali metal salts thereof. The alkali metal may be, e.g., Na, K, or Li. The thickener may be included in an amount of about 0.1 parts by weight to about 3 parts by weight, based on 100 parts by weight of the negative active material.

The conductive material may be included to provide electrode conductivity, and a suitable electrically conductive material that does not cause a chemical change may be used. Examples of the conductive material may include a carbon material such as natural graphite, artificial graphite, carbon black, acetylene black, ketjen black, a carbon fiber, or the like; a metal material of a metal powder or a metal fiber including copper, nickel, aluminum, silver, or the like; a conductive polymer such as a polyphenylene derivative; or a mixture thereof.

The current collector may include, e.g., a copper foil, a nickel foil, a stainless steel foil, a titanium foil, a nickel foam, a copper foam, a polymer substrate coated with a conductive metal, or a combination thereof.

The negative electrode according one embodiment may be prepared by mixing the negative active material, the binder and, optionally, the conductive material in a solvent to prepare an active material composition and coating the active material composition on the current collector. The solvent may be water.

The positive electrode may include a current collector and a positive active material layer formed on the current collector.

The positive active material may include lithiated intercalation compounds that reversibly intercalate and deintercalate lithium ions, e.g., composite oxides of a metal (e.g., cobalt, manganese, nickel, or a combination thereof), and lithium. In an implementation, the compounds represented by one of the following chemical formulae may be used. $Li_aA_{1-b}X_bD^1_2$ ($0.90 \leq a \leq 1.8$, $0 \leq b \leq 0.5$); $Li_aA_{1-b}X_bO_{2-c1}D^1_{c1}$ ($0.90 \leq a \leq 1.8$, $0 \leq b \leq 0.5$, $0 \leq c1 \leq 0.05$); $Li_aE_{1-b}X_bO_{2-c1}D^1_{c1}$ ($0.90 \leq a \leq 1.8$, $0 \leq b \leq 0.5$, $0 \leq c1 \leq 0.05$); $Li_aE_{2-b}X_bO_{4-c1}D^1_{c1}$ ($0.90 \leq a \leq 1.8$, $0 \leq b \leq 0.5$, $0 \leq c1 \leq 0.05$); $Li_aNi_{1-b-c}Co_bX_cD^1_a$ ($0.90 \leq a \leq 1.8$, $0 \leq b \leq 0.5$, $0 \leq c \leq 0.05$, $0 < a = 2$); $Li_aNi_{1-b-c}Co_bX_cO_{2-a}T_a$ ($0.90 \leq a \leq 1.8$, $0 \leq b \leq 0.5$, $0 \leq c \leq 0.05$, $0 < a < 2$); $Li_aNi_{1-b-c}Co_bX_cO_{2-a}T_2$ ($0.90 \leq a \leq 1.8$, $0 \leq b \leq 0.5$, $0 \leq c \leq 0.05$, $0 < a < 2$); $Li_aNi_{1-b-c}Mn_bX_cD^1_a$ ($0.90 \leq a \leq 1.8$, $0 \leq b \leq 0.5$, $0 \leq c \leq 0.05$, $0 < a < 2$); $Li_aNi_{1-b-c}Mn_bX_cO_{2-a}T_a$ ($0.90 \leq a \leq 1.8$, $0 \leq b \leq 0.5$, $0 \leq c \leq 0.05$, $0 < a < 2$); $Li_aNi_{1-b-c}Mn_bX_cO_{2-a}T_2$ ($0.90 \leq a \leq 1.8$, $0 \leq b \leq 0.5$, $0 \leq c \leq 0.05$, $0 < a < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$), $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $Li_aFePO_4$ ($0.90 \leq a \leq 1.8$).

In the above chemical formulae, A may be Ni, Co, Mn, or a combination thereof; X may be Al, Ni, Co, Mn, Cr, Fe, Mg, Sr, V, a rare earth element, or a combination thereof; $D^1$ may be O, F, S, P, or a combination thereof; E may be Co, Mn, or a combination thereof; T may be F, S, P, or a combination thereof; G may be Al, Cr, Mn, Fe, Mg, La, Ce, Sr, V, or a combination thereof; Q may be Ti, Mo, Mn, or a combination thereof; Z may be Cr, V, Fe, Sc, Y, or a combination thereof; and J may be V, Cr, Mn, Co, Ni, Cu, or a combination thereof.

In an implementation, the compounds may have a coating layer on the surface, or may be mixed with another compound having a coating layer. The coating layer may include a coating element compound, e.g., an oxide of a coating element, a hydroxide of a coating element, an oxyhydroxide of a coating element, an oxycarbonate of a coating element, or a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed or formed in a method having no adverse influence on properties of a positive electrode active material by using these elements in the compound, e.g., spray coating, dipping, or the like.

In the positive electrode, a content of the positive active material may be about 90 wt % to about 98 wt % based on the total weight of the positive active material layer.

In an implementation, the positive active material layer may further include a binder and a conductive material. In an implementation, the binder and the conductive material may be included in an amount of about 1 wt % to about 5 wt %, respectively based on the total amount of the positive active material layer.

The binder may help improve binding properties of positive active material particles with one another and with a current collector. Examples of the binder may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene butadiene rubber, acrylated styrene butadiene rubber, an epoxy resin, nylon, and the like.

The conductive material may be included to provide electrode conductivity, and a suitable electrically conductive material that does not cause a chemical change may be used. Examples of the conductive material may include a carbon material such as natural graphite, artificial graphite, carbon black, acetylene black, ketjen black, a carbon fiber, or the like; a metal material of a metal powder or a metal fiber including copper, nickel, aluminum, silver, or the like; a conductive polymer such as a polyphenylene derivative; or a mixture thereof.

The current collector may include, e.g., aluminum foil, nickel foil, or a combination thereof.

The positive active material layer and the negative active material layer may be prepared by mixing an active material, a binder and, optionally, a conductive material, in a solvent to prepare an active material composition and coating the active material composition on a current collector. The solvent may be, e.g., N-methyl pyrrolidone. In an implementation, if the aqueous binder is used in the negative active material layer, the solvent may be water as a solvent used in the negative active material composition preparation.

The electrolyte may include a non-aqueous organic solvent and a lithium salt.

The non-aqueous organic solvent serves as a medium for transmitting ions taking part in the electrochemical reaction of a battery.

The non-aqueous organic solvent may include a carbonate, ester, ether, ketone, alcohol, or aprotic solvent.

The carbonate solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester solvent may include methyl acetate, ethyl acetate, n-propyl acetate, dimethyl acetate, methyl propionate, ethyl propionate, propyl propionate, decanolide, mevalonolactone, caprolactone, or the like. The ether solvent may include dibutyl ether, tetraglyme, diglyme, dimethoxyethane, 2-methyltetrahydrofuran, tetrahydrofuran, or the like. The ketone solvent may include cyclohexanone, or the like. The alcohol solvent may include ethyl alcohol, isopropyl alcohol, or the like. The aprotic solvent may include nitriles such as R-CN (where R is a C2 to C20 linear, branched, or cyclic hydrocarbon, and may include a double bond, an aromatic ring, or an ether bond), amides such as dimethylformamide, dioxolanes such as 1,3-dioxolane, sulfolanes, or the like the like.

The organic solvent may be used alone or in a mixture. When the organic solvent is used in a mixture, the mixture ratio may be suitably controlled in accordance with a desirable battery performance.

In an implementation, the carbonate solvent may include, e.g., a mixture of a cyclic carbonate and a linear carbonate. The cyclic carbonate and linear carbonate may be mixed together in a volume ratio of about 1:1 to about 1:9, and when the mixture is used as an electrolyte, it may have enhanced performance.

When the non-aqueous organic solvents are mixed and used, a mixed solvent of a cyclic carbonate and a linear carbonate, a mixed solvent of a cyclic carbonate and a propionate solvent, or a mixed solvent of a cyclic carbonate, a linear carbonate and a propionate solvent may be used. The propionate solvent may include methyl propionate, ethyl propionate, propyl propionate, or a combination thereof.

Herein, when a mixture of a cyclic carbonate and a linear carbonate, or a mixture of a cyclic carbonate and a propionate solvent is used, it may be used in a volume ratio of about 1:1 to about 1:9 considering the performances. In an implementation, a cyclic carbonate, a linear carbonate, and a propionate solvent may be mixed and used at a volume ratio of 1:1:1 to 3:3:4. The mixing ratios of the solvents may be appropriately adjusted according to desirable properties.

The organic solvent may further include an aromatic hydrocarbon solvent as well as the carbonate solvent. The carbonate solvent and the aromatic hydrocarbon solvent may be mixed together in a volume ratio of about 1:1 to about 30:1.

The aromatic hydrocarbon organic solvent may be an aromatic hydrocarbon compound represented by Chemical Formula 1.

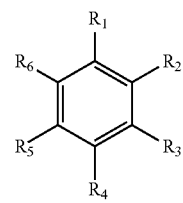

[Chemical Formula 1]

In Chemical Formula 1, $R_1$ to $R_6$ may each independently be, e.g., hydrogen, a halogen, a C1 to C10 alkyl group, a haloalkyl group, or a combination thereof.

Examples of the aromatic hydrocarbon organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate, e.g., an ethylene carbonate compound represented by Chemical Formula 2 as an additive for improving cycle life.

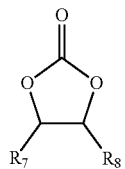

[Chemical Formula 2]

In Chemical Formula 2, $R_7$ and $R_8$ may each independently be, e.g., hydrogen, a halogen, a cyano group (CN), a nitro group ($NO_2$), or a C1 to C5 fluoroalkyl group. In an implementation, at least one of $R_7$ and $R_8$ may be a halogen, a cyano group (CN), a nitro group ($NO_2$), or a C1 to C5 fluoroalkyl group, and $R_7$ and $R_8$ are not simultaneously hydrogen.

Examples of the ethylene carbonate compound may include difluoro ethylenecarbonate, chloroethylene carbonate, dichloroethylene carbonate, bromoethylene carbonate, dibromoethylene carbonate, nitroethylene carbonate, cyanoethylene carbonate, and fluoroethylene carbonate. An amount of the additive for improving the cycle-life characteristics may be used within an appropriate range.

The electrolyte may further include vinylethylene carbonate, propane sultone, succinonitrile, or a combination thereof, and the used amount may be suitably controlled.

The lithium salt dissolved in an organic solvent supplies a battery with lithium ions, basically operates the rechargeable lithium battery, and improves transportation of the lithium ions between a positive electrode and a negative electrode. Examples of the lithium salt may include a supporting salt, e.g., $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein x and y are natural numbers, e.g., an integer of 1 to 20, LiCl, LiI or $LiB(C_2O_4)_2$ (lithium bis(oxalato) borate: LiBOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

A separator may be between the positive electrode and the negative electrode depending on a type of a rechargeable lithium battery. The separator may include, e.g., polyethylene, polypropylene, polyvinylidene fluoride or multi-layers thereof having two or more layers and may be a mixed multilayer such as a polyethylene/polypropylene double-layered separator, a polyethylene/polypropylene/polyethylene triple-layered separator, a polypropylene/polyethylene/polypropylene triple-layered separator, or the like.

The FIGURE is an exploded perspective view of a rechargeable lithium battery according to an embodiment. As illustrated, the rechargeable lithium battery according to an embodiment may be a prismatic battery, or may include variously-shaped batteries such as a cylindrical battery, a pouch battery, or the like.

Referring to the FIGURE, a rechargeable lithium battery 100 according to an embodiment may include an electrode assembly 40 manufactured by winding a separator 30 between a positive electrode 10 and a negative electrode 20 and a case 50 housing the electrode assembly 40. An electrolyte may be impregnated in the positive electrode 10, the negative electrode 20, and the separator 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

Magnesium silicide ($Mg_2Si$) was primarily heat-treated at 610° C. for 20 hours under an air atmosphere.

Thereafter, the heat-treated product was added to hydrochloric acid to etch, and then filtered to obtain an etching product, porous silicon.

The obtained porous silicon was mixed with petroleum pitch as an amorphous carbon precursor at a ratio in order to have an amount of amorphous carbon in the final negative active material shown in Table 3.

The resulting mixture was secondarily heat-treated at 1,000° C. to prepare a negative active material. The produced negative active material had pores with an average size of 50 nm therein, and included silicon and magnesium silicate and a soft carbon coating on the pores, the silicon, and the magnesium silicate.

The negative active material was used as a first negative active material, and natural graphite was used as a second negative active material, and the first negative active material, the second negative active material, a styrene butadiene rubber binder, and carboxymethyl cellulose as a thickener were mixed at a 12:85.5:1.5:1.0 weight ratio in a water solvent to prepare a negative active material slurry. Herein, the mixing ratio of the styrene butadiene rubber binder and the carboxymethyl cellulose thickener was to be a 60:40 by weight ratio.

The negative active material slurry was coated on a Cu foil current collector and dried to prepare a negative electrode including the current collector and a negative active material layer formed on the current collector.

Using the negative electrode, a $LiCoO_2$ positive electrode, and an electrolyte, a rechargeable lithium cell was fabricated. As the electrolyte, 1.5M $LiPF_6$ in a mixed solvent of ethylene carbonate and ethylmethyl carbonate and dimethyl carbonate (20:10:70 volume ratio) was used.

Example 2

A negative active material was prepared by the same procedure as in Example 1, except that the primary heat-treatment was performed at 600° C. Using the negative active material, a negative electrode and a rechargeable lithium cell were fabricated by the same procedure as in Example 1.

Example 3

A negative active material was prepared by the same procedure as in Example 1, except that the primary heat-treatment was performed at 620° C. Using the negative active material, a negative electrode and a rechargeable lithium cell were fabricated by the same procedure as in Example 1.

Example 4

A negative active material was prepared by the same procedure as in Example 1, except that the primary heat-treatment was performed for 10 hours. Using the negative active material, a negative electrode and a rechargeable lithium cell were fabricated by the same procedure as in Example 1.

Example 5

A negative active material was prepared by the same procedure as in Example 1, except that the primary heat-treatment was performed for 15 hours. Using the negative active material, a negative electrode and a rechargeable lithium cell were fabricated by the same procedure as in Example 1.

Example 6

A negative active material was prepared by the same procedure as in Example 1, except that the primary heat-treatment was performed for 20 hours. Using the negative active material, a negative electrode and a rechargeable lithium cell were fabricated by the same procedure as in Example 1.

Example 7

A negative active material was prepared by the same procedure as in Example 1, except that the primary heat-treatment was performed for 25 hours. Using the negative active material, a negative electrode and a rechargeable lithium cell were fabricated by the same procedure as in Example 1.

Example 8

A negative active material was prepared by the same procedure as in Example 1, except that the primary heat-treatment was performed at 615° C. Using the negative active material, a negative electrode and a rechargeable lithium cell were fabricated by the same procedure as in Example 1.

Example 9

A negative active material was prepared by the same procedure as in Example 1, except that the primary heat-treatment was performed for 5 hours. Using the negative active material, a negative electrode and a rechargeable lithium cell were fabricated by the same procedure as in Example 1.

Comparative Example 1

A negative active material was prepared by the same procedure as in Example 1, except that the primary heat-treatment was performed at 550° C. Using the negative active material, a negative electrode and a rechargeable lithium cell was fabricated by the same procedure as in Example 1.

Comparative Example 2

A negative active material was prepared by the same procedure as in Example 1, except that the primary heat-treatment was performed at 560° C. Using the negative active material, a negative electrode and a rechargeable lithium cell were fabricated by the same procedure as in Example 1.

Comparative Example 3

A negative active material was prepared by the same procedure as in Example 1, except that the primary heat-treatment was performed at 570° C. Using the negative active material, a negative electrode and a rechargeable lithium cell were fabricated by the same procedure as in Example 1.

Comparative Example 4

A negative active material was prepared by the same procedure as in Example 1, except that the primarily heat-treatment was performed for 1 hour. Using the negative active material, a negative electrode and a rechargeable lithium cell was fabricated by the same procedure as in Example 1.

Comparative Example 5

A negative active material was prepared by the same procedure as in Example 1, except that the primary heat-treatment was performed at 710° C. Using the negative active material, a negative electrode and a rechargeable lithium cell were fabricated by the same procedure as in Example 1.

Comparative Example 6

A negative active material was prepared by the same procedure as in Example 1, except that magnesium silicide ($Mg_2Si$) was primary heat-treated at 610° C. for 20 hours under a nitrogen atmosphere. Using the negative active material, a negative electrode and a rechargeable lithium cell were fabricated by the same procedure as in Example 1.

Comparative Example 7

A negative active material was prepared by the same procedure as in Example 1, except that magnesium silicide ($Mg_2Si$) was primary heat-treated at 610° C. for 20 hours under a $CO_2$ atmosphere. Using the negative active material, a negative electrode and a rechargeable lithium cell were fabricated by the same procedure as in Example 1.

The heat-treatment conditions for magnesium silicide in Examples 1 to 9 and Comparative Examples 1 to 7 are summarized in Table 1.

TABLE 1

| | Heat treatment temperature (° C.) | Heat treatment time (hr) | Atmosphere |
|---|---|---|---|
| Example 1 | 610 | 20 | Air |
| Example 2 | 600 | 20 | Air |
| Example 3 | 620 | 20 | Air |
| Example 4 | 610 | 10 | Air |
| Example 5 | 610 | 15 | Air |
| Example 6 | 610 | 20 | Air |
| Example 7 | 610 | 25 | Air |
| Example 8 | 615 | 20 | Air |
| Example 9 | 610 | 5 | Air |
| Comparative Example 1 | 550 | 20 | Air |
| Comparative Example 2 | 560 | 20 | Air |
| Comparative Example 3 | 570 | 20 | Air |
| Comparative Example 4 | 610 | 1 | Air |
| Comparative Example 5 | 710 | 20 | Air |
| Comparative Example 6 | 610 | 20 | Nitrogen |
| Comparative Example 7 | 610 | 20 | $CO_2$ |

Experimental Example 1) Physical Properties Evaluation

X-ray diffraction peak intensities of the negative active materials of Examples 1 to 9 and Comparative Examples 1 to 7 were measured using a CuKα-ray. The results are shown in Table 2. From the results, $I_{(MgSiO3(610)}/I_{Si(111)}$ was obtained and the results are shown in Table 2.

The full width at half maximum, FWHM (111), of the diffraction peak of a (111) plane by X-ray diffraction using a CuKα-ray for Si included in the prepared negative active material was measured. The detailed measurement condition was as below:

Device: Malvern Panalytical (Xpert pro)

Wavelength: Kα=1.540598 Å

Scan rate: ~1.5 deg/min

2theta window: 20°-80°

The results are shown in Table 2.

Furthermore, the crystalline size of the negative active material was measured. The results are shown in Table 2.

Pore sizes of the negative active materials according to Examples 1 to 9 and Comparative Examples 1 to 7 were measured by a nitrogen adsorption method (BET, BJH method). The results are shown in Table 2.

TABLE 2

| | Si(111) 2-theta (degrees) | Si(111) intensity | Si(111) FWHM | Crystalline size (nm) | MgSiO₃(610) 2-theta (degrees) | MgSiO₃(610) intensity | $I_{MgSiO3(610)}/I_{Si(111)}$ | Average size of pore (nm) |
|---|---|---|---|---|---|---|---|---|
| Example 1 | 28.52 | 111866.4 | 0.254 | 32.27 | 30.75 | 135.4 | 0.00121 | 50 |
| Example 2 | 28.40 | 38483.4 | 0.252 | 32.52 | 30.63 | 173 | 0.0045 | 57 |
| Example 3 | 28.42 | 48274.8 | 0.221 | 37.09 | 30.67 | 182.3 | 0.00378 | 70 |
| Example 4 | 28.45 | 43867.7 | 0.232 | 35.33 | 30.67 | 226.9 | 0.00517 | 74 |
| Example 5 | 28.46 | 22359.2 | 0.24 | 34.15 | 30.69 | 110.7 | 0.00495 | 68 |
| Example 6 | 28.51 | 21288.4 | 0.247 | 33.19 | 30.77 | 124.3 | 0.00584 | 62 |
| Example 7 | 28.42 | 25013.4 | 0.269 | 30.47 | 30.59 | 94.8 | 0.00379 | 53 |
| Example 8 | 28.5 | 44627.1 | 0.251 | 32.7 | 30.78 | 45.2 | 0.00101 | 51 |
| Example 9 | 28.46 | 34519.6 | 0.233 | 35.1 | 30.66 | 311.1 | 0.009 | 66 |
| Comparative Example 1 | 28.45 | 34687.5 | 0.229 | 35.79 | 30.61 | 548.2 | 0.0158 | 19 |
| Comparative Example 2 | 28.40 | 47362.6 | 0.261 | 31.40 | 30.74 | 489.3 | 0.01033 | 32 |
| Comparative Example 3 | 28.51 | 25127.6 | 0.246 | 33.32 | 30.60 | 338.4 | 0.01347 | 31 |
| Comparative Example 4 | 28.43 | 27764.3 | 0.255 | 32.1 | 30.66 | 278.6 | 0.01 | 24 |
| Comparative Example 5 | 28.45 | 37153.2 | 0.243 | 33.7 | 30.74 | 37 | 0.001 | 46 |
| Comparative Example 6 | 28.5 | 24984.3 | 0.246 | 33.3 | — | — | 0 | 29 |
| Comparative Example 7 | 28.42 | 48337.9 | 0.26 | 31.5 | — | — | 0 | 30 |

As shown in Table 2, the active materials according to Examples 1 to 9 had a ratio ($I_{MgSiO3(610)}/I_{Si(111)}$) which fell into a range of $0.001 < I_{MgSiO3(610)}/I_{Si(111)} < 0.01$, but Comparative Examples 1 to 5 had ratios out of the range.

The negative active material according to Comparative Examples 6 and 7 had no peak related to MgSiO₃ which indicated no generation of MgSiO₃.

Experimental Example 2) Cell Characteristics Evaluation

The cells according to Examples 1 to 9 and Comparative Examples 1 to 7 were formation charged and discharged once at 0.1 C, and the formation charge and discharge capacity was measured. The discharge capacity results are shown in Table 3. From the formation charge and discharge capacity, the initial efficiency was measured. The results are shown in Table 3.

The capacity of amorphous carbon was considered as 250 mAh/g, and the value corresponding to the amount of amorphous carbon included in the negative active material was subtracted from the formation discharge capacity and then it was divided by the amount of silicon to obtain a formation silicon capacity. The results are shown in Table 3.

The cells according to Examples 1 to 7 and Comparative Examples 1 to 3 were charged and discharged at 1 C for 50 cycles and the capacity ratio of $50^{th}$ discharge capacity to ate to $1^{st}$ discharge capacity was measured. The results are shown in Table 3, as cycle-life retention.

Experimental Example 3) Amount of MgSiO₃

Amounts of MgSiO₃ in the negative active materials according to Examples 1 to 9 and Comparative Examples 1 to 7 were measured by a ICP analysis method. The results are shown in Table 3.

TABLE 3

| | Formation discharge capacity (mAh/g) | Initial efficiency (%) | Formation silicon capacity (mAh/g) | Cycle life-retention (%) | Amount of amorphous carbon to total weight of negative active material (wt %) | MgSiO₃ to total weight of negative active material (wt %) |
|---|---|---|---|---|---|---|
| Example 1 | 2406 | 85.2 | 2558 | 83 | 7 | 0.0167 |
| Example 2 | 1713 | 84.7 | 2730 | 85 | 41 | 0.0188 |
| Example 3 | 1781 | 85.9 | 2890 | 86 | 42 | 0.0312 |
| Example 4 | 2062 | 86.3 | 2718 | 84 | 27 | 0.0247 |
| Example 5 | 2261 | 86.2 | 2738 | 83 | 20 | 0.0149 |
| Example 6 | 1926 | 85.3 | 2644 | 84 | 30 | 0.0191 |
| Example 7 | 1845 | 85.7 | 2667 | 85 | 34 | 0.0113 |
| Example 8 | 1936 | 84.9 | 2498 | 84 | 25 | 0.0102 |
| Example 9 | 2108 | 86 | 2830 | 85 | 28 | 0.051 |
| Comparative Example 1 | 1861 | 81.2 | 2614 | 81 | 32 | 0.0884 |
| Comparative Example 2 | 1977 | 82.4 | 2776 | 78 | 32 | 0.0713 |
| Comparative Example 3 | 2052 | 81.7 | 2548 | 80 | 22 | 0.0457 |
| Comparative Example 4 | 1996 | 83.1 | 2190 | 81 | 10 | 0.0623 |
| Comparative Example 5 | 2231 | 82.8 | 3080 | 79 | 30 | 0.0124 |

TABLE 3-continued

| | Formation discharge capacity (mAh/g) | Initial efficiency (%) | Formation silicon capacity (mAh/g) | Cycle life-retention (%) | Amount of amorphous carbon to total weight of negative active material (wt %) | MgSiO₃ to total weight of negative active material (wt %) |
|---|---|---|---|---|---|---|
| Comparative Example 6 | 2167 | 82.9 | 2876 | 82 | 27 | — |
| Comparative Example 7 | 2012 | 83.2 | 2767 | 82 | 30 | — |

As shown in Table 3, the cells including the negative active materials according to Examples 1 to 9, which had the ratio ($I_{MgSiO3(610)}/I_{Si(111)}$) of $0.001 < I_{MgSiO3(610)}/I_{Si(111)} < 0.01$, exhibited excellent initial efficiency and capacity retention. The cells including the negative active materials according to Comparative Examples 1 to 7, which had the ratio ($I_{MgSiO3(610)}/I_{Si(111)}$) out of $0.001 < I_{MgSiO3(610)}/I_{Si(111)} < 0.01$, exhibited deteriorated initial efficiency and cycle-life-retention.

By way of summation and review, a silicon negative active material may be advantageous for exhibiting high-capacity and high efficiency, and may exhibit a volume expansion during charge and discharge.

To address the volume expansion, combining a material with a carbon matrix, a silicon oxide, or a silicon alloy has been considered.

One or more embodiments may provide a negative active material for a rechargeable lithium battery capable of improving initial efficiency and cycle-life characteristics.

The negative active material for a rechargeable lithium battery according to one embodiment may exhibit excellent initial efficiency and cycle-life characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material for a rechargeable lithium battery, the active material comprising a porous silicon-carbon composite that includes silicon, carbon, and magnesium silicate ($MgSiO_3$),
wherein the negative active material has a diffraction peak intensity ratio $I_{MgSiO3(610)}/I_{Si(111)}$ of $0.001 < I_{MgSiO3(610)}/I_{Si(111)} < 0.01$, which is a ratio of a diffraction peak intensity $I_{MgSiO3(610)}$ by $MgSiO_3$ at $2\theta=30°$ to $32°$ to a diffraction peak intensity $I_{Si(111)}$ by $Si(111)$ detected at $2\theta=27.5°$ to $29.5°$ in a X-ray diffraction analysis.

2. The negative active material for a rechargeable lithium battery as claimed in claim 1, wherein the magnesium silicate is included in the negative active material in an amount of 0.01 wt % to 1.0 wt %, based on a total weight of the negative active material.

3. The negative active material for a rechargeable lithium battery as claimed in claim 1, wherein the magnesium silicate is included in the negative active material in an amount of 0.01 wt % to 0.6 wt %, based on a total weight of the negative active material.

4. The negative active material for a rechargeable lithium battery as claimed in claim 1, wherein the carbon includes amorphous carbon.

5. The negative active material for a rechargeable lithium battery as claimed in claim 4, wherein the amorphous carbon includes soft carbon, hard carbon, or a combination thereof.

6. The negative active material for a rechargeable lithium battery as claimed in claim 1, wherein the carbon is included in the negative active material in an amount of 5 wt % to 45 wt %, based on a total weight of the negative active material.

7. The negative active material for a rechargeable lithium battery as claimed in claim 1, wherein:
the porous silicon-carbon composite includes pores, and
the carbon covers an exterior wall of the pores, the silicon, and the magnesium silicate.

8. The negative active material for a rechargeable lithium battery as claimed in claim 7, wherein the pores have an average size of 50 nm or more.

9. The negative active material for a rechargeable lithium battery as claimed in claim 8, wherein the pores have an average size of 50 nm to 500 nm.

10. The negative active material for a rechargeable lithium battery as claimed in claim 1, wherein the negative active material is prepared by:
primary heat-treating magnesium silicide to prepare a heated product,
etching the heated product to prepare a porous silicon,
mixing the porous silicon with an amorphous carbon precursor to prepare a mixture, and
secondary heat-treating the mixture.

11. The negative active material for a rechargeable lithium battery as claimed in claim 10, wherein the primary heat treatment is performed under an air atmosphere.

12. The negative active material for a rechargeable lithium battery as claimed in claim 10, wherein the primary heat treatment is performed at 600° C. to 700° C. for 5 hours to 30 hours.

13. The negative active material for a rechargeable lithium battery as claimed in claim 10, wherein the etching is performed using an acid.

14. The negative active material for a rechargeable lithium battery as claimed in claim 13, wherein the acid is hydrochloric acid.

15. The negative active material for a rechargeable lithium battery as claimed in claim 10, wherein a mixing ratio of the porous silicon and the amorphous carbon precursor is 95:5 to 55:45 by weight.

16. The negative active material for a rechargeable lithium battery as claimed in claim 10, wherein the secondary heat treatment is performed at 800° C. to 1,200° C.

17. A rechargeable lithium battery, comprising:
a negative electrode including the negative active material as claimed in claim 1;

a positive electrode including a positive active material; and a non-aqueous electrolyte.

18. The rechargeable lithium battery as claimed in claim 17, wherein the negative electrode includes:

the negative active material as a first negative active material, and crystalline carbon as a second negative active material.

19. The rechargeable lithium battery as claimed in claim 18, wherein a mixing ratio of the first negative active material and the second negative active material is 1:99 to 40:60 by weight.

* * * * *